United States Patent
Ye (10) Patent No.: US 10,126,605 B2
(45) Date of Patent: Nov. 13, 2018

(54) HVA LIQUID CRYSTAL DISPLAY

(71) Applicant: Shenzhen China Star Optoelectronics Technology Co., Ltd., Shenzhen (CN)

(72) Inventor: Yanxi Ye, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 157 days.

(21) Appl. No.: 14/888,441

(22) PCT Filed: Oct. 12, 2015

(86) PCT No.: PCT/CN2015/091726
§ 371 (c)(1),
(2) Date: Nov. 1, 2015

(87) PCT Pub. No.: WO2017/035912
PCT Pub. Date: Mar. 9, 2017

(65) Prior Publication Data
US 2017/0160597 A1    Jun. 8, 2017

(30) Foreign Application Priority Data
Sep. 1, 2015 (CN) .......................... 2015 1 0557529

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1393* (2013.01); *G02F 1/13439* (2013.01);
(Continued)

(58) Field of Classification Search
CPC ... G02F 2001/134318; G02F 1/136286; G02F 1/133707
See application file for complete search history.

(56) References Cited

U.S. PATENT DOCUMENTS

2007/0070279 A1* 3/2007 Sugiyama ......... G02F 1/134336
349/139
2007/0236640 A1* 10/2007 Kimura ............. G02F 1/134363
349/141
(Continued)

FOREIGN PATENT DOCUMENTS

CN            101479778 A       7/2009

*Primary Examiner* — Angela K Davison
*Assistant Examiner* — Jonathan Y Jung
(74) *Attorney, Agent, or Firm* — Leong C. Lei (57) ABSTRACT

The present invention provides a HVA liquid crystal display panel, comprising an upper substrate (1), a lower substrate (2) and a liquid crystal layer (3) located between the upper substrate (1) and the lower substrate (2); the upper substrate (1) comprises a first substrate (11), and a common electrode layer (12) located on the first substrate (11) facing the lower substrate (2); the lower substrate (2) comprises a second substrate (21), a plurality of gate scan lines and a plurality of data lines (22) located on the second substrate (21); the plurality of gate scan lines and the plurality of data lines (22) crisscross to form a plurality of sub pixel areas; the common electrode layer (12) comprises a hollow part (121) correspondingly above the gate scan lines and the data lines (22), to prevent border light leakage and color washout phenomenon of the sub pixel areas for replacing a black matrix to achieve light shielding function.

15 Claims, 5 Drawing Sheets

(51) Int. Cl.
  *G02F 1/1335* (2006.01)
  *G02F 1/1362* (2006.01)
  *G02F 1/139* (2006.01)

(52) U.S. Cl.
  CPC .. *G02F 1/133345* (2013.01); *G02F 1/133514* (2013.01); *G02F 1/136286* (2013.01); *G02F 2001/133302* (2013.01); *G02F 2001/134318* (2013.01); *G02F 2001/134345* (2013.01); *G02F 2201/121* (2013.01); *G02F 2201/123* (2013.01); *G02F 2201/52* (2013.01)

(56) References Cited

U.S. PATENT DOCUMENTS

2009/0257009 A1* 10/2009 Hirato ............... G02F 1/134336
  349/110
2016/0223845 A1* 8/2016 Chiang ................ H01L 27/124

* cited by examiner

HVA LIQUID CRYSTAL DISPLAY

FIELD OF THE INVENTION

The present invention relates to a display technology field, and more particularly to a HVA liquid crystal display.

BACKGROUND OF THE INVENTION

In recent years, the Thin Film Transistor-LCD (TFT-LCD) has been rapidly developed and applied widely. Most of the liquid crystal displays on the present market are back light type liquid crystal display devices, which comprise a liquid crystal display panel and a back light module. Generally, the liquid crystal display panel comprises a CF (Color Filter) substrate, a TFT (Thin Film Transistor) substrate, LC (Liquid Crystal) sandwiched between the CF substrate and TFT substrate and sealant. The working principle is that the light of backlight module is reflected to generate images by applying driving voltages to the two glass substrate for controlling the rotations of the liquid crystal molecules.

For the TFT-LCD in the mainstream market, three types, which respectively are Twisted Nematic (TN), Super Twisted Nematic (STN), In-Plane Switching (IPS) and Vertical Alignment (VA) can be illustrated. The VA liquid crystal display possesses extremely high contrast than the liquid crystal displays of other types. It has very wide application in large scale display, such as television or etc. The High Vertical Alignment (HVA) mode is one important branch in the VA modes. When the HVA liquid crystal display panel functions, the twist of the liquid crystal molecules in the liquid crystal layer is controlled by the vertical electric field formed by the pixel electrode of the array substrate side and the common electrode of the color filter substrate side.

Figure 1:
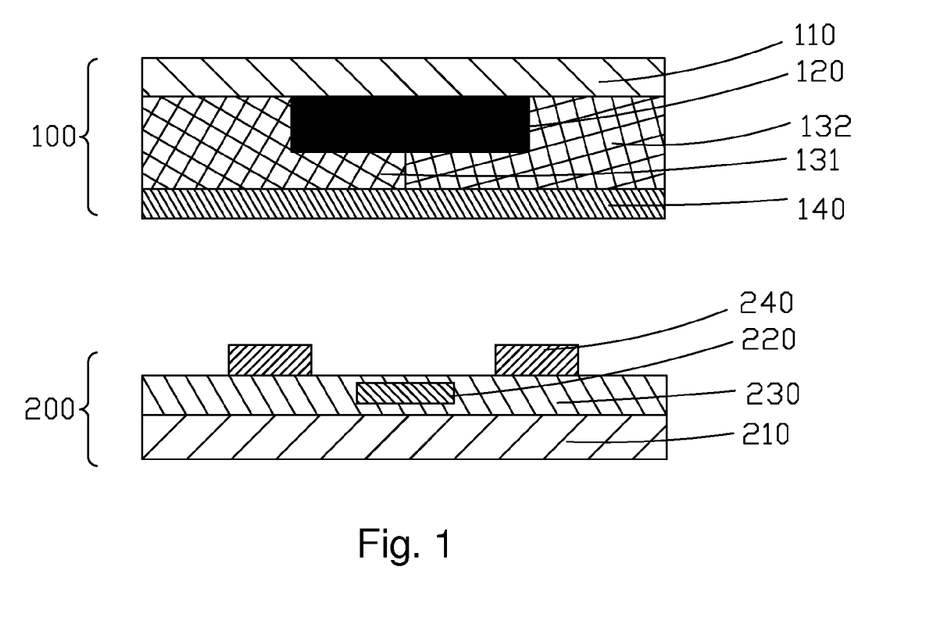
FIG. 1 is a sectional structure diagram of a liquid crystal display panel according to prior art at the data line.

Generally, a black matrix is provided at one side of the TFT substrate facing the CF substrate. As shown in FIG. 1, the liquid crystal display panel comprises an upper substrate 100, a lower substrate 200 and a liquid crystal layer 300 located between the upper substrate 100 and the lower substrate 200, and the upper substrate 100 comprises a first substrate 110, a black matrix 120 located on the first substrate 110, a color filter layer and a common electrode layer 140, wherein the color filter layer comprises a red color block 131, a green color block 132 and a blue color block; the lower substrate comprises a second substrate 210, gate scan lines and data lines 220 located on the second substrate 210, a passivation layer 230 and a pixel electrode layer on the passivation layer 230, wherein the gate scan lines and the data lines 220 surround to form a plurality of sub pixel areas, and the pixel electrode layer comprises one pixel electrode 240 correspondingly in each sub pixel area, and the pixel electrode 240 is divided into a plurality of regions in each sub pixel, such as a pozidriv shape pixel electrode, and the common electrode layer 140 is a continuous plane type common electrode; the red color block 131, the green color block 132 and the blue color block are located respectively corresponding to the sub pixel areas.

Figure 2:
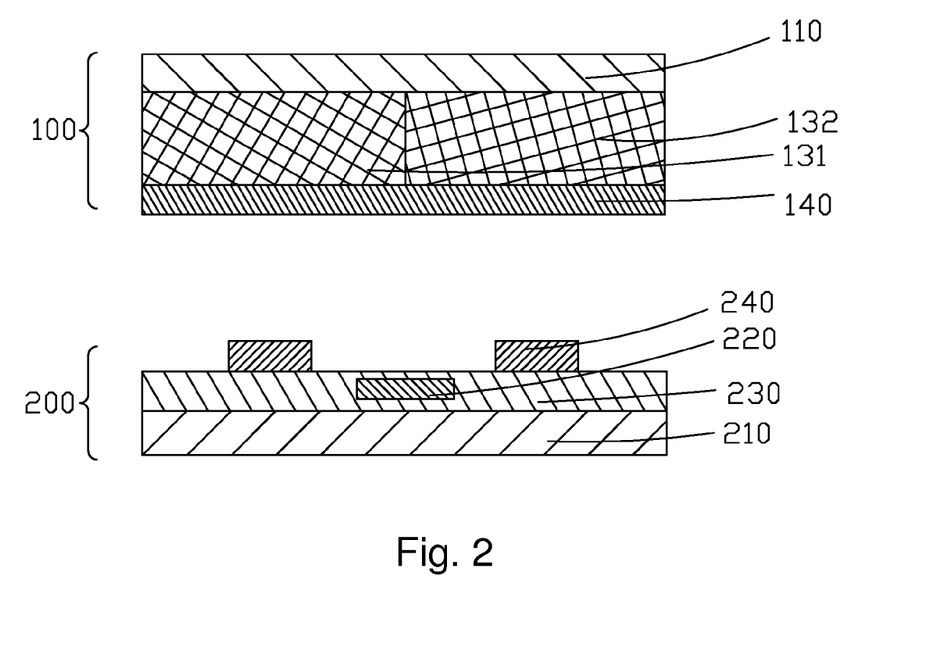
FIG. 2 is a sectional diagram of another liquid crystal display panel according to prior art at the data line.
Figure 3:
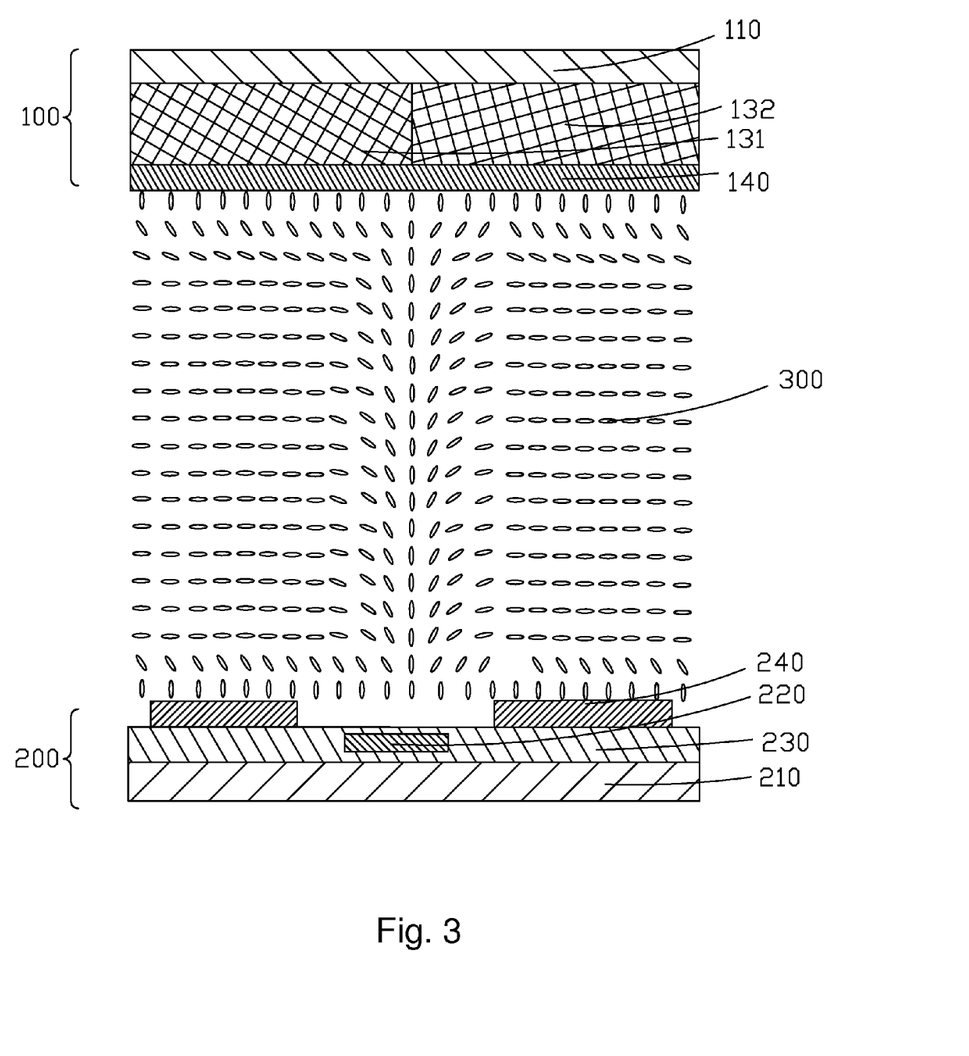
FIG. 3 is a twist form diagram of the liquid crystals above the data lines of the liquid crystal display panel in FIG. 2 while they are in an electric field.
Figure 4:
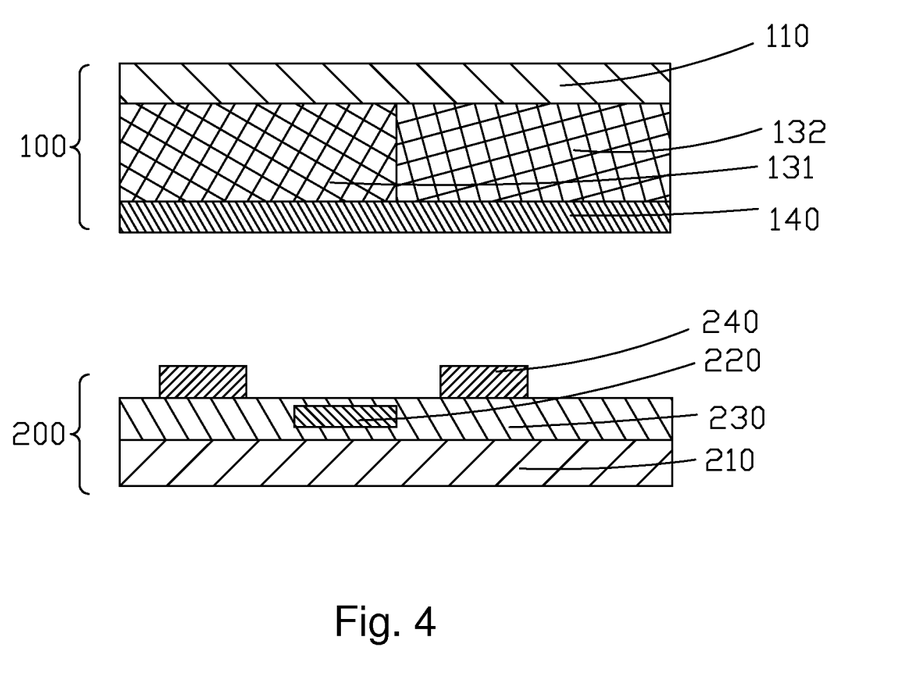
FIG. 4 is a sectional diagram of the liquid crystal display panel in FIG. 2 while the alignment of the upper, lower substrates of the liquid crystal display panel is shifted.

In the development of the liquid crystal display technology, it is a trend of the technology development that the black matrix of the CF substrate side is removed either for the consideration of saving the cot or the consideration of the curve design. However, the display quality issue happens if there is no black matrix. As shown in FIG. 2, the liquid crystal panel does not comprise the black matrix. In the condition of black state, the voltage levels of the pixel electrode 240 and the common electrode 140 are the same, no light leakage occurs in the sub pixels. However, in condition that the voltage of the data line 220 and the voltage of the common electrode 140 are not the same, an electric field may generate to drive the liquid crystals to be twisted and cause the light leakage; as shown in FIG. 3, the liquid crystals 300 are twisted because of being driven by the electric field formed by the data line 220 and the common electrode 140. Accordingly, the border light leakage phenomenon of the sub pixel areas happens. Besides, while the alignment of the TFT substrate and the CF substrate is shifted and the liquid crystal panel does not comprise the black matrix, the color washout issue can easily occur. As shown in FIG. 4, while the alignment of the CF substrate 100 and the TFT substrate 200 is shifted, and the pixel electrode 240 previously drives the liquid crystals in the green sub pixel to show the green image, due to the alignment shift, the electric field of the pixel electrode 240 may have chance to influence the liquid crystals at the border of the red sub pixel and result in that the green image is mixed with a little red color and the color washout happens. Similarly, the same situation will also happen at the gate scan line position of the liquid crystal panel.

SUMMARY OF THE INVENTION

An objective of the present invention is to provide a HVA liquid crystal display panel, in which the common electrode layer comprises hollow part correspondingly above the gate scan lines and the data lines to prevent border light leakage and color washout phenomenon of the sub pixel areas and thus, for replacing a black matrix to achieve light shielding function.

For realizing the aforesaid objective, the present invention provides a HVA liquid crystal display panel, comprising an upper substrate, a lower substrate and a liquid crystal layer located between the upper substrate and the lower substrate;

the upper substrate comprises a first substrate, and a common electrode layer located at one side of the first substrate facing the lower substrate;

the lower substrate comprises a second substrate, a plurality of gate scan lines and a plurality of data lines located on the second substrate;

the plurality of gate scan lines and the plurality of data lines crisscross to form a plurality of sub pixel areas; the plurality of gate scan lines and the plurality of data lines are at borders of the plurality of sub pixel areas;

the common electrode layer comprises a hollow part correspondingly above the gate scan lines and the data lines, and no electric field generates among the hallow part and the gate scan lines, the data lines, to prevent border light leakage and color washout phenomenon of the sub pixel areas because liquid crystals in the area are driven for replacing a black matrix to achieve light shielding function.

The lower substrate further comprises a passivation layer located on the second substrate, and a pixel electrode layer located on the passivation layer, and the pixel electrode layer comprises one pixel electrode corresponding to each sub pixel area; the sub pixel area comprises a red sub pixel area, a green sub pixel area and a blue sub pixel area.

The upper substrate further comprises a color filter layer located between the first substrate and the common electrode layer, and the color filter layer comprises a red color block, a green color block and a blue color block respectively corresponding to the red sub pixel area, the green sub pixel area and the blue sub pixel area.

The lower substrate further comprises a color filter layer located on the passivation layer, and the color filter layer comprises a red color block, a green color block and a blue color block respectively corresponding to the red sub pixel area, the green sub pixel area and the blue sub pixel area.

A projection of the hollow part in the common electrode layer on the lower substrate completely covers the data lines.

A projection of the hollow part in the common electrode layer on the lower substrate completely covers the gate scan lines.

Material of the common electrode layer and the pixel electrode layer is ITO.

The hollow part of the common electrode layer is formed by a photolithography process with a mask.

The pixel electrode layer is a patterned electrode layer, and the pixel electrode is divided into multiple domains in each sub pixel area.

Both the first substrate and the second substrate are glass substrates.

The present invention further provides a HVA liquid crystal display panel, comprising an upper substrate, a lower substrate and a liquid crystal layer located between the upper substrate and the lower substrate;

the upper substrate comprises a first substrate, and a common electrode layer located at one side of the first substrate facing the lower substrate;

the lower substrate comprises a second substrate, a plurality of gate scan lines and a plurality of data lines located on the second substrate;

the plurality of gate scan lines and the plurality of data lines crisscross to form a plurality of sub pixel areas; the plurality of gate scan lines and the plurality of data lines are at borders of the plurality of sub pixel areas;

the common electrode layer comprises a hollow part correspondingly above the gate scan lines and the data lines, and no electric field generates among the hallow part and the gate scan lines, the data lines, to prevent border light leakage and color washout phenomenon of the sub pixel areas because liquid crystals in the area are driven for replacing a black matrix to achieve light shielding function;

wherein the lower substrate further comprises a passivation layer located on the second substrate, and a pixel electrode layer located on the passivation layer, and the pixel electrode layer comprises one pixel electrode corresponding to each sub pixel area; the sub pixel area comprises a red sub pixel area, a green sub pixel area and a blue sub pixel area;

wherein a projection of the hollow part in the common electrode layer on the lower substrate completely covers the data lines;

wherein a projection of the hollow part in the common electrode layer on the lower substrate completely covers the gate scan lines.

The benefits of the present invention are: in the HVA liquid crystal display panel, the common electrode of the upper substrate comprises a hallow part correspondingly above the gate scan lines and the data lines so that no common electrode corresponds to the data lines and the gate scan lines thereabove, and no electric field generates at the borders of the sub pixel areas, to effectively prevent border light leakage and color washout phenomenon of the sub pixel areas for replacing a black matrix to achieve light shielding function.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 5:
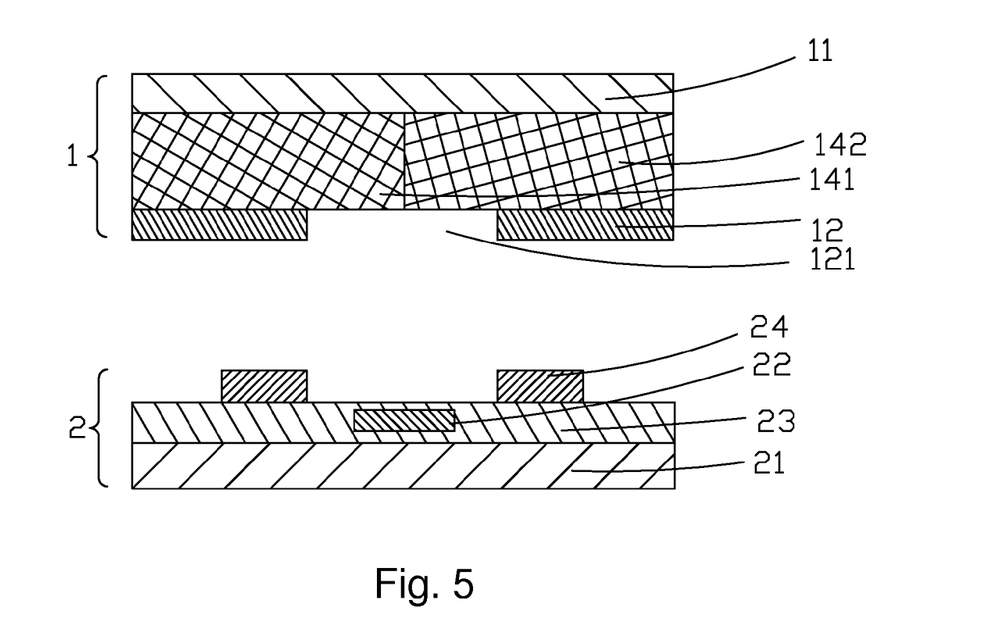
FIG. 5 is a sectional structure diagram of a HVA liquid crystal display panel according to the present invention at the data line.
Figure 6:
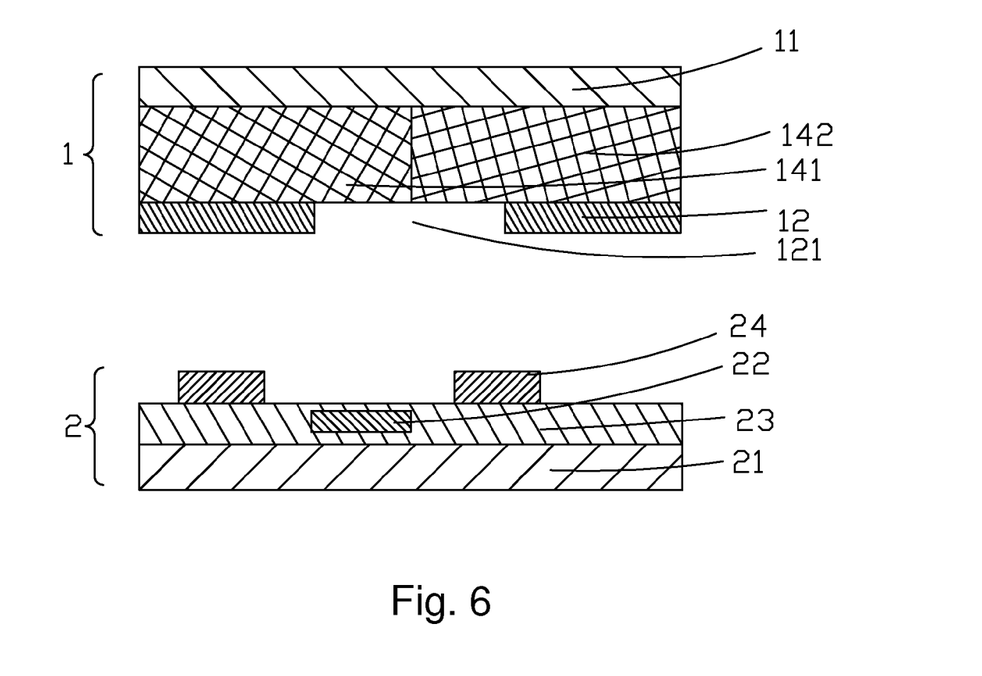
FIG. 6 is a sectional diagram of the HVA liquid crystal display panel according to the present invention while the alignment of the upper, lower substrates of the HVA liquid crystal display panel is shifted.
Figure 7:
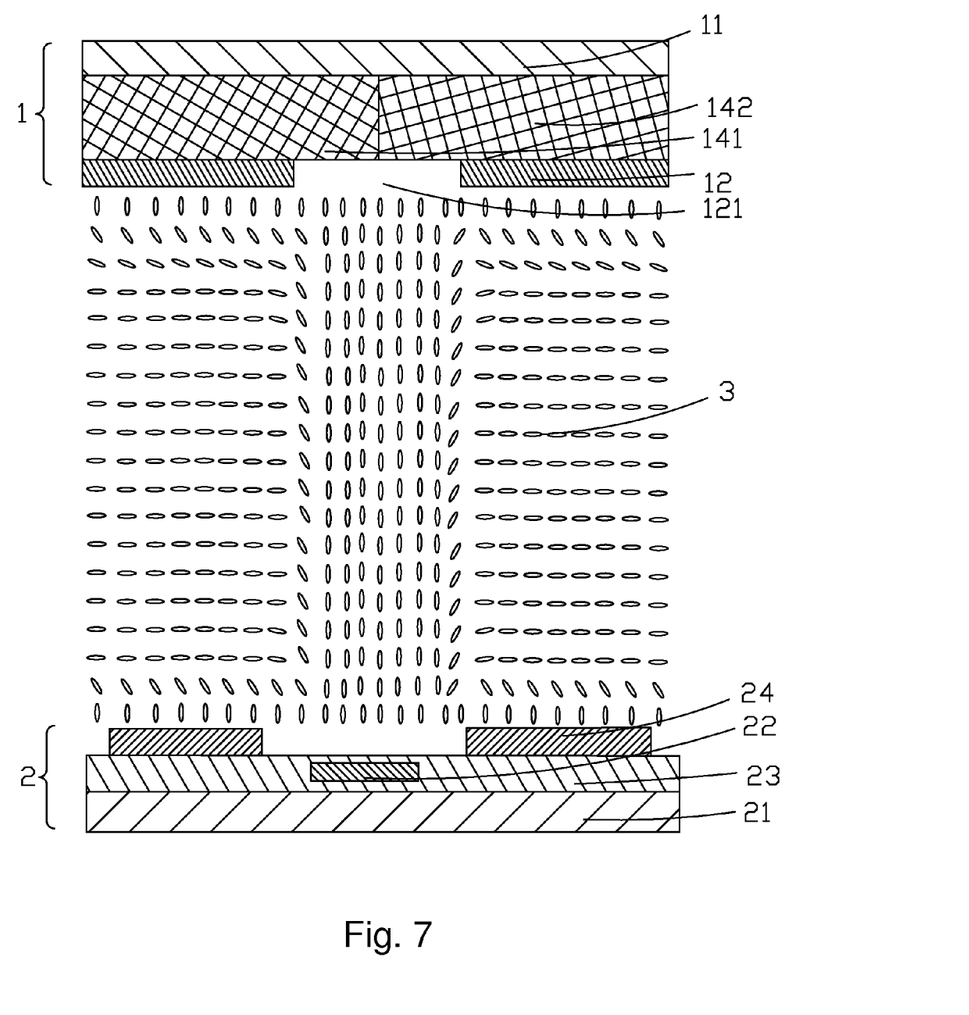
FIG. 7 is a twist form diagram of the liquid crystals above the data lines of the HVA liquid crystal display panel according to the present invention while they are in an electric field.

Please refer from FIG. 5 to FIG. 7. The present invention provides a HVA liquid crystal display panel, comprising an upper substrate 1, a lower substrate 2 and a liquid crystal layer 3 located between the upper substrate 1 and the lower substrate 2;

the upper substrate 1 comprises a first substrate 11, and a common electrode 12 located at one side of the first substrate 11 facing the lower substrate 2;

the lower substrate 2 comprises a second substrate 21, a plurality of gate scan lines and a plurality of data lines 22 located on the second substrate 21;

the plurality of gate scan lines and the plurality of data lines 22 crisscross to form a plurality of sub pixel areas; the plurality of gate scan lines and the plurality of data lines 22 are at borders of the plurality of sub pixel areas.

the common electrode layer 12 comprises a hollow part 121 correspondingly above the gate scan lines and the data lines, i.e. no electric field generates among the hallow part 121 and the gate scan lines, the data lines 22, to prevent border light leakage and color washout phenomenon of the sub pixel areas because liquid crystals in the area are driven for replacing a black matrix to achieve light shielding function.

Specifically, both the first substrate 11 and the second substrate 22 are glass substrates.

Specifically, material of the common electrode layer 12 is ITO; the hollow part 121 of the common electrode layer 12 is formed by a photolithography process with a mask.

Specifically, a projection of the hollow part 121 in the common electrode layer 12 on the lower substrate 2 completely covers the data lines 22 and the gate scan lines to ensure that no electric field generates in the spaces among the data lines 22, the gate scan lines and the hallow part 121.

Specifically, the lower substrate 2 further comprises a passivation layer 23 located on the second substrate 21, and a pixel electrode layer located on the passivation layer 23, and the pixel electrode layer comprises one pixel electrode 24 corresponding to each sub pixel area; the sub pixel area comprises a red sub pixel area, a green sub pixel area and a blue sub pixel area; the pixel electrode layer is a patterned electrode layer, and the pixel electrode 24 is divided into multiple domains in each sub pixel area. Specifically, material of the pixel electrode layer is ITO.

Specifically, the upper substrate 1 further comprises a color filter layer located between the first substrate 11 and the common electrode layer 12, and the color filter layer comprises a red color block 141, a green color block 142 and a blue color block respectively corresponding to the red sub pixel area, the green sub pixel area and the blue sub pixel area.

Alternatively, the color filter layer is located on the lower substrate 2, i.e. the liquid crystal panel can be a COA liquid crystal display panel, and the lower substrate 2 comprises a color filter layer located on the passivation layer 23, and the color filter layer comprises a red color block, a green color block and a blue color block respectively corresponding to the red sub pixel area, the green sub pixel area and the blue sub pixel area.

As shown in FIG. 5, in the present invention, the common electrode layer 12 comprises a hollow part 121 correspondingly above the gate scan lines and the data lines 22, i.e. the part of the common electrode right under the black matrix in the present liquid crystal panel is etched. Thus, no electric field generates among the hallow part and the gate scan lines, and the liquid crystals at the position cannot be driven by the electric field. Therefore, the polarization light in the area cannot penetrate the liquid crystals in this area, and then, can have the same function of the black matrix. Besides, as shown in FIG. 6, while the alignment of the upper, lower substrates is shifted, the pixel electrode 24 belonging to the green sub pixel area is shifted to the joint area of the red color block and the green color block, and no corresponding common electrode above exists to form the electric field therewith. Accordingly, the liquid crystals in the red sub pixel area are not affected and no color washout will happen.

FIG. 7 is a twist form diagram of the liquid crystals in the liquid crystal display panel according to the present invention under the high voltage. In comparison with the liquid crystal panel structure according to prior art, the liquid crystals at the borders of the sub pixel areas in the liquid crystal panel of the present invention cannot be affected by the electric field and be in the vertical state.

In conclusion, in the HVA liquid crystal display panel, the common electrode of the upper substrate comprises a hallow part correspondingly above the gate scan lines and the data lines so that no common electrode corresponds to the data lines and the gate scan lines thereabove, and no electric field generates at the borders of the sub pixel areas, to effectively prevent border light leakage and color washout phenomenon of the sub pixel areas for replacing a black matrix to achieve light shielding function.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A HVA liquid crystal display panel, comprising an upper substrate, a lower substrate and a liquid crystal layer located between the upper substrate and the lower substrate;
the upper substrate comprises a first substrate, and a plane type common electrode layer located at one side of the first substrate facing the lower substrate;
the lower substrate comprises a second substrate, a plurality of gate scan lines and a plurality of data lines located on the second substrate;
the plurality of gate scan lines and the plurality of data lines crisscross to form a plurality of sub pixel areas; the plurality of gate scan lines and the plurality of data lines are at borders of the plurality of sub pixel areas;
the plane type common electrode layer comprises a hollow part correspondingly above the gate scan lines and the data lines, and the upper substrate does not comprise a black matrix above the gate scan lines and the data lines at the borders of the plurality of sub pixel areas, wherein a projection of the hollow part in the plane type common electrode layer of the upper substrate on the lower substrate completely covers the gate scan lines and the data lines at the borders of the plurality of sub pixel areas, and no electric field generates among the hallow part and the gate scan lines, the data lines, to prevent border light leakage of the sub pixel areas because liquid crystals in the area are driven for replacing the black matrix to achieve light shielding function and to prevent color washout phenomenon as an alignment of the upper substrate and the lower substrate is shifted.

2. The HVA liquid crystal display panel according to claim 1, wherein the lower substrate further comprises a passivation layer located on the second substrate, and a pixel electrode layer located on the passivation layer, and the pixel electrode layer comprises one pixel electrode corresponding to each sub pixel area; the sub pixel area comprises a red sub pixel area, a green sub pixel area and a blue sub pixel area.

3. The HVA liquid crystal display panel according to claim 2, wherein the upper substrate further comprises a color filter layer located between the first substrate and the plane type common electrode layer, and the color filter layer comprises a red color block, a green color block and a blue color block respectively corresponding to the red sub pixel area, the green sub pixel area and the blue sub pixel area.

4. The HVA liquid crystal display panel according to claim 2, wherein the lower substrate further comprises a color filter layer located on the passivation layer, and the color filter layer comprises a red color block, a green color block and a blue color block respectively corresponding to the red sub pixel area, the green sub pixel area and the blue sub pixel area.

5. The HVA liquid crystal display panel according to claim 2, wherein material of the plane type common electrode layer and the pixel electrode layer is ITO.

6. The HVA liquid crystal display panel according to claim 1, wherein the hollow part of the plane type common electrode layer is formed by a photolithography process with a mask.

7. The HVA liquid crystal display panel according to claim 1, wherein the pixel electrode layer is a patterned electrode layer, and the pixel electrode is divided into multiple domains in each sub pixel area.

8. The HVA liquid crystal display panel according to claim 1, wherein both the first substrate and the second substrate are glass substrates.

9. A HVA liquid crystal display panel, comprising an upper substrate, a lower substrate and a liquid crystal layer located between the upper substrate and the lower substrate;
the upper substrate comprises a first substrate, and a plane type common electrode layer located at one side of the first substrate facing the lower substrate;
the lower substrate comprises a second substrate, a plurality of gate scan lines and a plurality of data lines located on the second substrate;
the plurality of gate scan lines and the plurality of data lines crisscross to form a plurality of sub pixel areas;
the plurality of gate scan lines and the plurality of data lines are at borders of the plurality of sub pixel areas;
the plane type common electrode layer comprises a hollow part correspondingly above the gate scan lines and the data lines, and the upper substrate does not comprise a black matrix above the gate scan lines and the data lines at the borders of the plurality of sub pixel areas, wherein a projection of the hollow part in the plane type common electrode layer of the upper substrate on the lower substrate completely covers the gate scan lines and the data lines at the borders of the plurality of sub pixel areas, and no electric field generates among the hallow part and the gate scan lines, the data lines, to prevent border light leakage of the sub pixel areas because liquid crystals in the area are driven for replacing the black matrix to achieve light shielding function and to prevent color washout phenomenon as an alignment of the upper substrate and the lower substrate is shifted;
wherein the lower substrate further comprises a passivation layer located on the second substrate, and a pixel electrode layer located on the passivation layer, and the pixel electrode layer comprises one pixel electrode corresponding to each sub pixel area; the sub pixel area comprises a red sub pixel area, a green sub pixel area and a blue sub pixel area.

10. The HVA liquid crystal display panel according to claim 9, wherein the upper substrate further comprises a color filter layer located between the first substrate and the plane type common electrode layer, and the color filter layer comprises a red color block, a green color block and a blue color block respectively corresponding to the red sub pixel area, the green sub pixel area and the blue sub pixel area.

11. The HVA liquid crystal display panel according to claim 9, wherein the lower substrate further comprises a color filter layer located on the passivation layer, and the color filter layer comprises a red color block, a green color block and a blue color block respectively corresponding to the red sub pixel area, the green sub pixel area and the blue sub pixel area.

12. The HVA liquid crystal display panel according to claim 9, wherein material of the plane type common electrode layer and the pixel electrode layer is ITO.

13. The HVA liquid crystal display panel according to claim 9, wherein the hollow part of the plane type common electrode layer is formed by a photolithography process with a mask.

14. The HVA liquid crystal display panel according to claim 9, wherein the pixel electrode layer is a patterned electrode layer, and the pixel electrode is divided into multiple domains in each sub pixel area.

15. The HVA liquid crystal display panel according to claim 9, wherein both the first substrate and the second substrate are glass substrates.

* * * * *